United States Patent
Kubo

(10) Patent No.: US 10,247,610 B2
(45) Date of Patent: Apr. 2, 2019

(54) CHROMATIC CONFOCAL SENSOR AND MEASUREMENT METHOD

(71) Applicant: Mitutoyo Corporation, Kawasaki-shi, Kanagawa (JP)

(72) Inventor: Koji Kubo, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 50 days.

(21) Appl. No.: 15/726,276

(22) Filed: Oct. 5, 2017

(65) Prior Publication Data

US 2018/0113027 A1 Apr. 26, 2018

(30) Foreign Application Priority Data

Oct. 21, 2016 (JP) ................. 2016-206565

(51) Int. Cl.
| | |
|---|---|
| *G01J 3/28* | (2006.01) |
| *G01J 3/50* | (2006.01) |
| *G01J 3/02* | (2006.01) |
| *G01J 3/10* | (2006.01) |

(52) U.S. Cl.
CPC ............. *G01J 3/502* (2013.01); *G01J 3/0208* (2013.01); *G01J 3/10* (2013.01); *G01J 2003/102* (2013.01)

(58) Field of Classification Search
CPC ... G01B 11/24; G01B 11/2518; G01B 11/026; G01B 11/25; G01B 11/245
USPC ....................................................... 356/328
See application file for complete search history.

(56) References Cited

U.S. PATENT DOCUMENTS

| | | | |
|---|---|---|---|
| 2009/0143377 A1 | 6/2009 | Ng et al. | |
| 2011/0013186 A1* | 1/2011 | Miki | G01B 11/026 356/364 |
| 2017/0115180 A1* | 4/2017 | Hirata | G01N 21/6458 |

FOREIGN PATENT DOCUMENTS

JP 2014-141535 8/2014

* cited by examiner

*Primary Examiner* — Md M Rahman
(74) *Attorney, Agent, or Firm* — Rankin, Hill & Clark LLP

(57) ABSTRACT

A chromatic confocal sensor includes: a light source portion that emits a plurality of light beams having different wavelengths; a plurality of optical heads that converge the plurality of light beams emitted from the light source portion at different focal positions and emit measurement light reflected by a measurement point at the focal positions; a spectrometer including a line sensor, and an optical system that includes a diffraction grating that diffracts a plurality of measurement light beams emitted from the plurality of optical heads, and emits the plurality of measurement light beams diffracted by the diffraction grating to a plurality of different light-receiving areas of the line sensor; and a position calculation portion that calculates a position of a plurality of measurement points as a measurement target of the plurality of optical heads based on a light-receiving position of the plurality of light-receiving areas of the line sensor.

10 Claims, 7 Drawing Sheets

CHROMATIC CONFOCAL SENSOR AND MEASUREMENT METHOD

CROSS REFERENCE TO RELATED APPLICATIONS

This application claims the benefit of Japanese Priority Patent Application JP 2016-206565 filed Oct. 21, 2016, the entire contents of which are incorporated herein by reference.

BACKGROUND

The present invention relates to a chromatic confocal sensor and a measurement method that uses this.

From the past, a technology of a chromatic confocal sensor has been used for measuring a height of an object to be measured, and the like. For example, Japanese Patent Translation Publication No. 2014/141535 (hereinafter, referred to as Patent Literature 1) discloses a confocal measurement apparatus that performs a multipoint measurement of a displacement of a measurement target using a confocal optical system of a plurality of head portions as shown in FIG. 1 thereof.

In this confocal measurement apparatus, an optical filter is provided in each of the head portions, and a wavelength band to be used for the measurement is set so as to differ among the head portions. For example, in an example shown in FIG. 1 of Patent Literature 1, light having a wavelength of about 400 nm to 600 nm is used in a first head portion $10a$, and light having a wavelength of about 600 nm to 800 nm is used in a second head portion $10b$ (paragraphs [0028], [0031], etc. in specification of Patent Literature 1).

By differentiating the wavelength bands of light to be used in the head portions in this way, an image pickup device arranged inside a spectrometer can be divided into a plurality of areas (channels) to be used by the respective head portions. As a result, a multipoint measurement of a measurement target becomes possible using only one spectrometer (image pickup device) with respect to a plurality of optical heads (paragraphs [0045] to [0049] etc. in specification of Patent Literature 1).

SUMMARY

In the chromatic confocal sensor capable of executing a multipoint measurement in this way, a technology capable of reducing the number of necessary components is required.

In view of the circumstances as described above, the present invention aims at providing a chromatic confocal sensor capable of executing a multipoint measurement with a small number of components and a measurement method that uses this.

For attaining the object described above, a chromatic confocal sensor according to an embodiment of the present invention includes a light source portion, a plurality of optical heads, a spectrometer, and a position calculation portion.

The light source portion emits a plurality of light beams having different wavelengths.

The plurality of optical heads converge the plurality of light beams emitted from the light source portion at different focal positions and emit measurement light reflected by a measurement point at the focal positions.

The spectrometer includes a line sensor and an optical system. The optical system includes a diffraction grating that diffracts a plurality of measurement light beams emitted from the plurality of optical heads, and emits each of the plurality of measurement light beams diffracted by the diffraction grating to a plurality of different light-receiving areas of the line sensor.

The position calculation portion calculates a position of each of a plurality of measurement points as a measurement target of the plurality of optical heads based on a light-receiving position of each of the plurality of light-receiving areas of the line sensor.

This chromatic confocal sensor includes the plurality of optical heads that perform a measurement using light emitted from the light source portion. The measurement light emitted from each of the optical heads is diffracted by the diffraction grating and respectively emitted to the plurality of light-receiving areas of the line sensor. Therefore, the position of each of the plurality of measurement points can be calculated based on each of the light-receiving positions of the plurality of light-receiving areas of the line sensor. As a result, it becomes possible to execute the multipoint measurement using a small number of components without increasing the number of diffraction gratings and line sensors.

The line sensor may be arranged while using a predetermined reference axis as a reference. In this case, the optical system may be configured while using the predetermined reference axis as a reference and include a plurality of light-incident ports that the plurality of measurement light beams enter, the plurality of light-incident ports being provided at different positions while using the predetermined reference axis as a reference.

By configuring the optical system while arranging the line sensor using the predetermined reference axis as a reference in this way, it becomes possible to emit the respective measurement light to different light-receiving areas of the line sensor. By providing the plurality of light-incident ports at different positions using the reference axis as a reference in particular, the respective measurement light can be easily emitted to the plurality of light-receiving areas.

The predetermined reference axis may correspond to an optical axis in a case where the measurement light is caused to enter the optical system from a virtual light-incident port of the spectrometer.

By configuring the optical system while arranging the line sensor using an optical axis in a case where measurement light enters from the virtual light-incident port as a reference, the measurement light that enters from the plurality of light-incident ports can be respectively emitted to the plurality of light-receiving areas of the line sensor.

The plurality of light-incident ports may be provided such that an optical axis of each of the plurality of measurement light beams that enter from the plurality of light-incident ports becomes substantially parallel to the predetermined reference axis.

Accordingly, it becomes possible to easily emit the respective measurement light to the plurality of light-receiving areas.

The plurality of light-incident ports may be provided at positions that are mutually symmetric with respect to the predetermined reference axis.

Accordingly, design of the spectrometer becomes easy.

The plurality of light-incident ports may be provided at positions that are mutually symmetric with respect to the virtual light-incident port.

By providing the plurality of light-incident ports at positions that are mutually symmetric with respect to the virtual light-incident port that is a start point of the reference axis, design of the spectrometer becomes easy.

The plurality of light-incident ports may be provided along a predetermined direction corresponding to a line direction of the line sensor.

Accordingly, design of the spectrometer becomes easy.

The spectrometer may include a light-incident surface on which the plurality of light-incident ports are provided. In this case, the plurality of light-incident ports may be provided on a straight line where a plane including the line direction and a direction of the predetermined reference axis intersect with the light-incident surface.

Accordingly, design of the spectrometer becomes easy.

When an area of the line sensor from a light-receiving position in a case where light having a shortest wavelength out of the plurality of light beams is emitted as the measurement light to a light-receiving position in a case where light having a longest wavelength is emitted as the measurement light, is assumed to be a measurement target area for each of the plurality of optical heads, the plurality of light-receiving areas may correspond to a plurality of measurement target areas respectively corresponding to the plurality of optical heads.

By configuring the line sensor, the optical system, and the like such that that the measurement target areas become mutually-different areas, the multipoint measurement can be executed with high accuracy.

The plurality of optical heads may be 2 or 3 optical heads.

By the present technology, simultaneous measurements of 2 or 3 points can be executed using a small number of components.

A measurement method according to an embodiment of the present invention includes emitting a plurality of light beams having different wavelengths.

By each of a plurality of optical heads, the plurality of emitted light beams are converged at different focal positions, and measurement light reflected by a measurement point at the focal positions is emitted.

A plurality of measurement light beams emitted from the plurality of optical heads are diffracted, and the diffracted light beams are emitted to a plurality of different light-receiving areas of a line sensor.

A position of each of a plurality of measurement points as a measurement target of the plurality of optical heads is calculated based on a light-receiving position of each of the plurality of light-receiving areas of the line sensor.

As described above, according to the present invention, the multipoint measurement can be executed with a small number of components. It should be noted that the effects described herein are not necessarily limited, and any effect described in the specification may be obtained.

DETAILED DESCRIPTION OF EMBODIMENTS

Hereinafter, embodiments of the present invention will be described with reference to the drawings.

Figure 1:
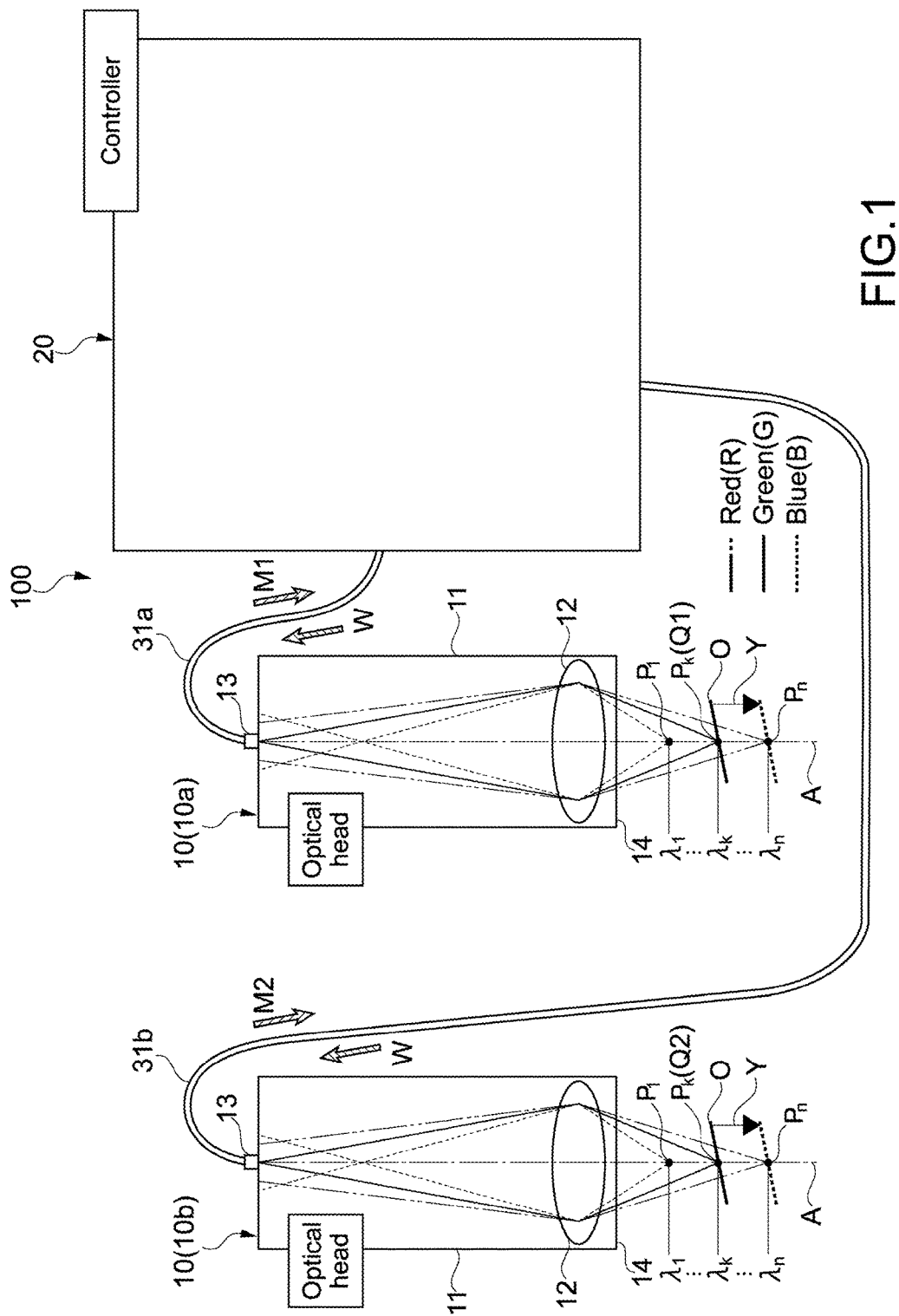
FIG. 1 is a schematic diagram showing a configuration example of a chromatic confocal sensor according to an embodiment.
Figure 2:
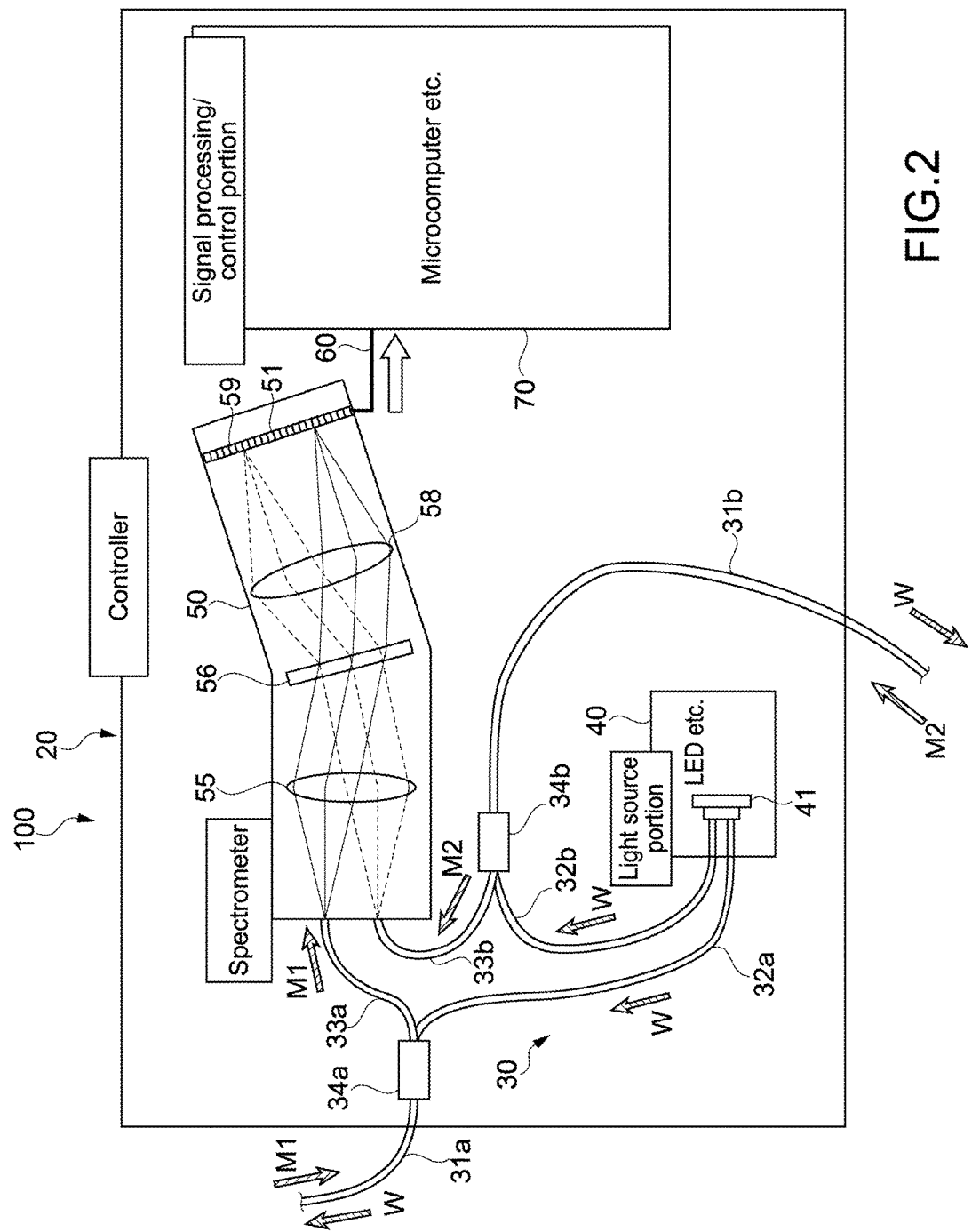
FIG. 2 is a schematic diagram showing a configuration example of the chromatic confocal sensor according to the embodiment.

FIGS. 1 and 2 are schematic diagrams each showing a configuration example of a chromatic confocal sensor according to an embodiment of the present invention. The chromatic confocal sensor is also called chromatic point sensor (CPS: Chromatic Confocal position Sensor). In descriptions below, the chromatic confocal sensor will be referred to as chromatic sensor.

A chromatic sensor 100 includes a plurality of optical heads 10, a controller 20, and an optical fiber portion 30. The controller 20 includes a light source portion 40, a spectrometer 50, and a signal processing/control portion (hereinafter, simply referred to as control portion) 70.

As shown in FIG. 1, two optical heads 10, that is, a first optical head 10a and a second optical head 10b, are provided as the plurality of optical heads 10. The first and second optical heads 10a and 10b include substantially the same configuration and are connected to the controller 20 via optical fibers 31a and 31b.

By the optical fibers 31a and 31b, measurement light emitted from the controller 20 is guided to the first and second optical heads 10a and 10b. In this embodiment, white light W including a plurality of visible light beams having different wavelengths from a blue wavelength range to a red wavelength range is used as the measurement light. A specific wavelength band of the white light W is not limited and may be designed as appropriate.

Common elements of the first and second optical heads 10a and 10b will collectively be described while referring to the first and second optical heads 10a and 10b as optical head 10.

The optical head 10 includes a pen-like casing portion 11 having a longitudinal direction as an optical axis A and an objective lens 12 provided inside the casing portion 11. The optical fiber 31a (optical fiber 31b) is connected to a connection port 13 provided at substantially a center of a rear end of the casing portion 11, so that white light W is emitted inside the casing portion 11. The white light W emitted from the optical fiber 31a (optical fiber 31b) passes through the objective lens 12 and is irradiated from an irradiation surface 14 provided at a front end of the casing portion 11 toward a measurement point Q1 (Q2) on an object to be measured O.

The objective lens 12 is a lens designed for a chromatic sensor and causes an axial chromatic aberration. Specifically, the objective lens 12 converges light that has entered the optical head 10 at focal positions P each corresponding to a wavelength $\lambda$ on the optical axis A. Therefore, in this embodiment, the plurality of visible light beams included in the white light W are converged by the objective lens 12 at mutually-different focal positions P that correspond to the wavelength $\lambda$.

As shown in FIG. 1, the plurality of visible light beams included in the white light W are separated from one another and emitted toward the measurement point Q1 (Q2) of the object to be measured O from the casing portion 11. It should be noted that in FIG. 1, light of 3 colors of RGB represent the plurality of visible light beams separated by the objective lens 12. Of course, light of other colors (other wavelengths) is also emitted.

A wavelength λ1 and focal position P1 shown in FIG. 1 represent a wavelength and focal position of visible light having a shortest wavelength out of the plurality of visible light beams and correspond to, for example, blue light B. A wavelength λn and focal position Pn represent a wavelength and focal position of visible light having a longest wavelength out of the plurality of visible light beams and correspond to, for example, red light R. A wavelength λk and focal position Pk represent a wavelength and focal position of arbitrary visible light out of the plurality of visible light beams, and green light G is exemplified in FIG. 2 (k=1 to n).

Further, the objective lens 12 converges visible light reflected by the measurement point Q1 (Q2) at the focal position Pk, at the optical fiber 31a (optical fiber 31b). Specifically, the connection port 13 at the rear end of the casing portion 11 is provided at a confocal position where visible light focused on and reflected by the measurement point Q1 (Q2) is converged by the objective lens 12. By connecting the optical fiber 31a (optical fiber 31b) to the connection port 13, visible light reflected by the measurement point Q1 (Q2) at the focal position Pk out of the plurality of visible light beams can be selectively emitted as measurement light M1 (M2).

In FIG. 1, light of the 3 colors of RGB reflected by the object to be measured O is illustrated between the objective lens 12 and the connection port 13. In the example shown in FIG. 1, the measurement point Q1 (Q2) is present at the focal position Pk (focal position of green light G in figure). Therefore, the green light G reflected by the measurement point Q1 (Q2) is converged at the optical fiber 31a (optical fiber 31b). As a result, reflected light of the green light G is emitted via the optical fiber 31a (optical fiber 31b) as the measurement light M1 (M2). The wavelength of the measurement light M1 (M2) emitted in this way and the position of the measurement point Q on the optical axis A are in a one-on-one relationship.

A configuration inside the optical head 10 is not limited and may be designed as appropriate. For example, other lenses such as a pinhole and a collimator lens may be used.

In this embodiment, the positions of the two measurement points Q1 and Q2 on the object to be measured O can be measured by the first and second optical heads 10a and 10b. In other words, the two measurement points Q1 and Q2 as measurement targets of the first and second optical heads 10a and 10b can be subjected to a multipoint measurement at the same time. Of course, the present invention is not limited to the case of performing the multipoint measurement on the same object to be measured O, and two different objects to be measured O can be measured at the same time.

The measurement light M1 and M2 emitted from the first and second optical heads 10a and 10b are guided to the controller 20 via the optical fibers 31a and 31b. In the example shown in FIG. 1, green light G is emitted as the measurement light M1 and M2. Of course, the present invention is not limited to the case of emitting the same wavelength light, and wavelength light respectively corresponding to the positions of the measurement points Q1 and Q2 are emitted.

As shown in FIG. 2, a white LED 41 is provided as a measurement light source in the light source portion 40. It should be noted that a mercury lamp or the like may be used in place of a solid-state light source such as an LED.

The optical fiber portion 30 includes optical fibers 31a, 32a, and 33a provided for the first optical head 10a and a fiber splitter 34a to which these are connected. The optical fiber portion 30 also includes optical fibers 31b, 32b, and 33b provided for the second optical head 10b and a fiber splitter 34b to which these are connected.

As shown in FIG. 2, the optical fiber 32a and the optical fiber 32b are connected to the white LED 41. Specifically, the optical fibers 32a and 32b are arranged such that end portions thereof are brought sufficiently close to each other in a light-emitting area of the white LED 41. Accordingly, white light W can be emitted from a single white LED 41 to the optical fibers 32a and 32b. It should be noted that an area of the light-emitting area, a core diameter of the optical fibers, and the like may be designed as appropriate, and an optical system or the like for emitting white light W to the two optical fibers may also be configured.

The fiber splitter 34a derives the white light W introduced from the optical fiber 32a to the optical fiber 31a connected to the first optical head 10a. Further, the fiber splitter 34a splits measurement light M1 introduced from the optical fiber 31a and derives it to the optical fiber 33a connected to the spectrometer 50. Therefore, the measurement light M1 emitted from the first optical head 10a is emitted to the inside of the spectrometer 50 from the optical fiber 33a.

The fiber splitter 34b derives the white light W introduced from the optical fiber 32b to the optical fiber 31b connected to the second optical head 10b. Further, the fiber splitter 34b splits measurement light M2 introduced from the optical fiber 31b and derives it to the optical fiber 33b connected to the spectrometer 50.

Therefore, the measurement light M2 emitted from the second optical head 10b is emitted to the inside of the spectrometer 50 from the optical fiber 33b.

Figure 3:
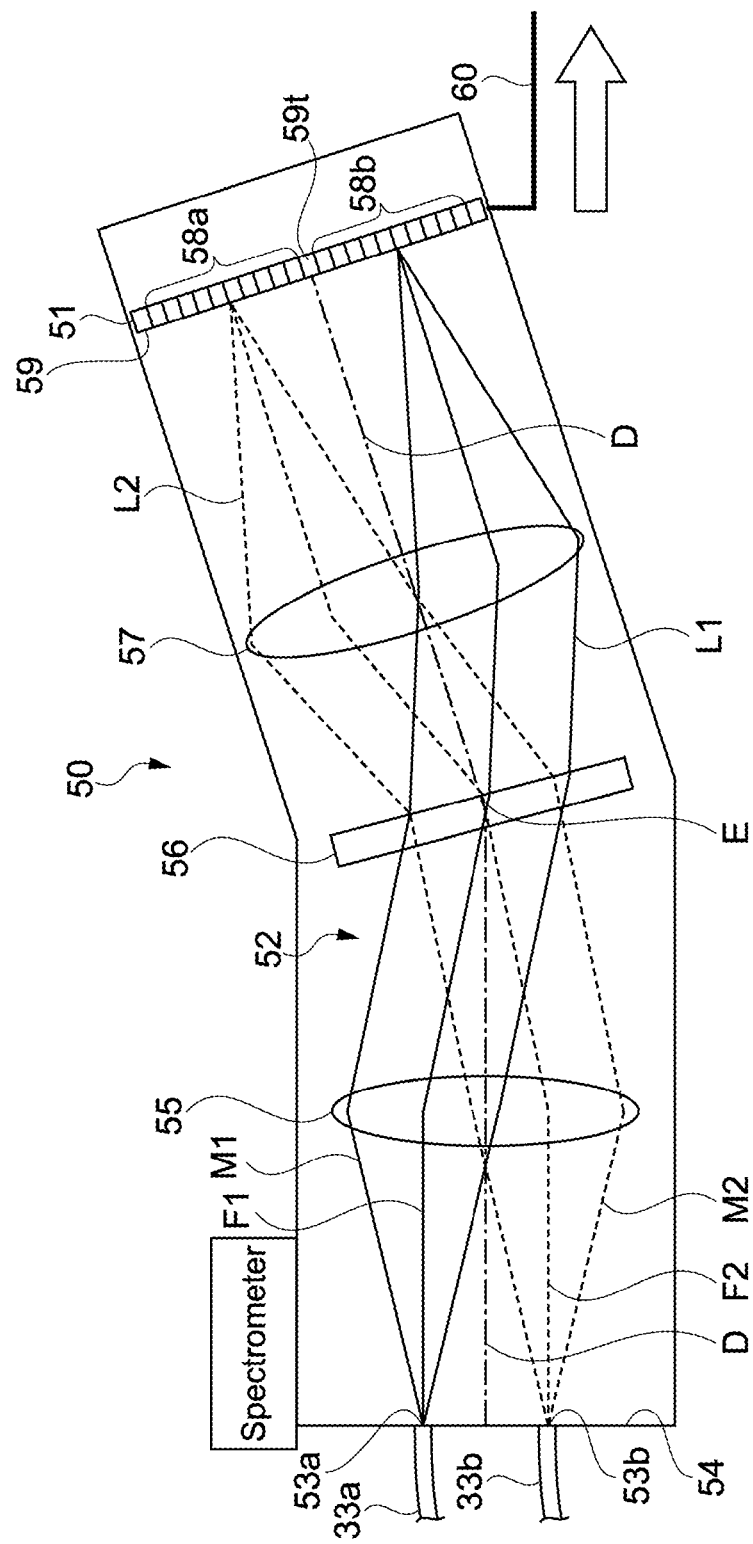
FIG. 3 is a schematic diagram showing a configuration example of a spectrometer.

FIG. 3 is a schematic diagram showing a configuration example of the spectrometer 50. The spectrometer 50 is a block for detecting a wavelength of each of the measurement light M1 emitted from the first optical head 10a via the optical fiber 31a and the measurement light M2 emitted from the second optical head 10b via the optical fiber 31b.

The spectrometer 50 includes a line sensor 51 and a spectroscopic optical system 52. The spectroscopic optical system 52 includes a light-incident surface 54 where a plurality of light-incident ports 53a and 53b are provided, a collimator lens 55, a diffraction grating 56, and an imaging lens 57. By the spectroscopic optical system 52, the first and second measurement light M1 and M2 are diffracted and emitted to two different light-receiving areas 58a and 58b of the line sensor 51.

The collimator lens 55 irradiates each of the measurement light M1 and M2 respectively emitted from the optical fibers 33a and 33b onto the diffraction grating 56.

The diffraction grating 56 diffracts the irradiated measurement light M1 and M2. The imaging lens 57 images the measurement light M1 and M2 diffracted by the diffraction grating 56 (hereinafter, referred to as diffracted light L1 and L2) on the line sensor 51 in a spot. In this embodiment, +1-order diffracted light L1 and L2 are imaged on the line sensor 51, but other diffracted light such as −1-order diffracted light may be imaged instead. It should be noted that a specific configuration of the diffraction grating 56 is not limited.

The line sensor 51 includes a plurality of pixels (light-receiving elements) 59 arranged in one direction. Each of the pixels 59 outputs a signal corresponding to an intensity of received light. A specific configuration of the line sensor 51 is not limited, and a CMOS line sensor, a CCD line sensor, or the like is used, for example.

It should be noted that the imaging lens 57 is a lens having a small chromatic aberration and is capable of imaging the diffracted light L1 and L2 on the line sensor 51 in spots irrespective of the wavelengths of the measurement light M1 and M2. On the other hand, emission angles of the diffracted light L1 and L2 emitted from the diffraction grating 56 depends on the wavelengths of the measurement light M1 and M2. Therefore, the spot position on the line sensor 51 becomes a parameter that depends on the wavelengths of the measurement light M1 and M2.

Signals output from the line sensor 51 are transmitted to the control portion 70 via a signal cable 60. In this embodiment, two signals, that is, a signal of the diffracted light L1 received by the first light-receiving area 58a and a signal of the diffracted light L2 received by the second light-receiving area 58b, are transmitted. It should be noted that a light shield mechanism or the like may be provided so that diffracted light does not enter the line sensor 51 except for the diffracted light L1 and L2 to become a spot position detection target. Moreover, an arrangement angle or the like of the diffraction grating 56 and the line sensor 51 may be adjusted as appropriate.

The line sensor 51 and the spectroscopic optical system 52 are configured using a reference axis D as a reference. In this embodiment, the reference axis D that extends in a direction substantially vertical to the light-incident surface 54 and extends while changing an angle in a predetermined direction at an intermediate point E is set. The collimator lens 55 is arranged on the reference axis D. The collimator lens 55 is arranged such that the reference axis D passes a center of the lens, that is, an optical axis of the collimator lens 55 and the reference axis D substantially match with each other.

The diffraction grating 56 is arranged at the intermediate point E where the direction of the reference axis D changes while facing a direction substantially orthogonal to the direction of the reference axis D whose angle has been changed. The diffraction grating 56 is arranged such that the reference axis D passes substantially the center thereof.

The imaging lens 57 is arranged on the reference axis D extending after its angle is changed. The imaging lens 57 is arranged such that the reference axis D passes a center of the lens, that is, an optical axis of the imaging lens 57 and the reference axis D substantially match with each other.

The line sensor 51 is arranged such that a pixel 59t at substantially the center is positioned on the reference axis D while facing a direction substantially orthogonal to the reference axis D. Further, the line sensor 51 is arranged such that a diffraction direction of the diffraction grating 56 and a sensor direction as an extension direction of the line sensor 51 substantially match with each other. It should be noted that the pixel 59t at substantially the center is a boundary between the first and second light-receiving areas 58a and 58b.

Figure 4:
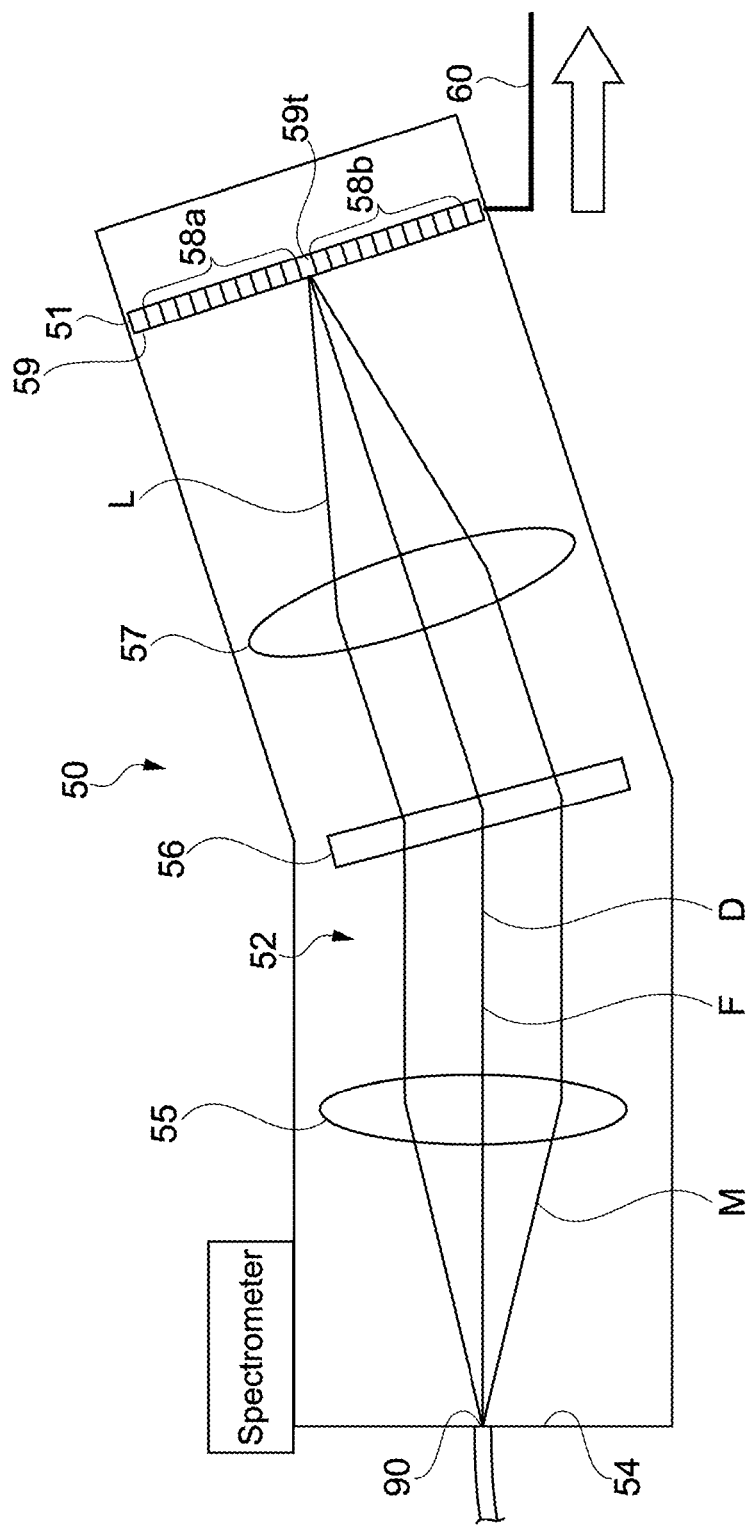
FIG. 4 is a schematic diagram for explaining a reference axis setting example.

FIG. 4 is a schematic diagram for explaining an example of setting the reference axis D. As shown in FIG. 4, a point where the light-incident surface 54 intersects with the reference axis D substantially vertically is assumed to be a virtual light-incident port 90 of the spectrometer 50. The spectroscopic optical system 52 is configured and the line sensor 51 is arranged such that, in a case where measurement light M enters from the virtual light-incident port 90, first-order diffracted light L of that incident light M enters the pixel 59t at substantially the center of the line sensor 51. It should be noted that an assumed wavelength of the measurement light M is not limited, but light of a wavelength at substantially the center of the wavelength band of the white light W (e.g., green light G) is typically assumed.

Therefore, the reference axis D shown in FIG. 3 and the like corresponds to an optical axis (axis that passes center of light flux) F of the measurement light M that has entered the spectroscopic optical system 52 from the virtual light-incident port 90. The line sensor 51 is arranged and the spectroscopic optical system 52 is configured such that, in a case where the measurement light M having a predetermined wavelength enters the spectroscopic optical system 52 from the virtual light-incident port 90, diffracted light L of that incident light enters a predetermined pixel 59 of the line sensor 51. This is included in the configuration of the spectroscopic optical system 52 while arranging the line sensor 51 using the reference axis D as a reference, though of course not limited thereto.

As shown in FIG. 3, the first and second light-incident ports 53a and 53b are formed at different positions on the light-incident surface 54 with the reference axis D being a reference. The optical fiber 33a that guides the first measurement light M1 is connected to the first light-incident port 53a. The optical fiber 33b that guides the second measurement light M2 is connected to the second light-incident port 53b. Therefore, the first measurement light M1 is emitted from the first light-incident port 53a, and the second measurement light M2 is emitted from the second light-incident port 53b.

The first and second measurement light M1 and M2 are emitted to the inside of the spectrometer 50 such that optical axes F1 and F2 thereof become parallel to the reference axis D. Specifically, the optical fibers 33a and 33b are respectively connected to the first and second light-incident ports 53a and 53b such that the optical axes F1 and F2 thereof become substantially parallel to the optical axis F of the measurement light M shown in FIG. 4.

Further, the first and second light-incident ports 53a and 53b are provided at positions that are mutually symmetrical with respect to the reference axis D. Specifically, the first and second light-incident ports 53a and 53b are provided such that distances thereof from the virtual light-incident port 90 as an intersection of the reference axis D and the light-incident surface 54 become the same.

Furthermore, the first and second light-incident ports 53a and 53b are provided on a straight line along a predetermined direction corresponding to a line direction of the line sensor 51. Specifically, the first and second light-incident ports 53a and 53b are provided on a straight line where a plane including the line direction and the direction of the reference axis D (surface parallel to paper surface in figure) and the light-incident surface 54 intersect. In other words, the first and second light-incident ports 53a and 53b are provided at positions deviated from the reference axis D in a substantially-vertical direction.

By configuring the spectroscopic optical system 52 and arranging the line sensor 51 in this way, the diffracted light L1 and L2 of the first and second measurement light M1 and M2 can be respectively emitted to the different first and second light-receiving areas 58a and 58b of the line sensor 51.

Figure 5:
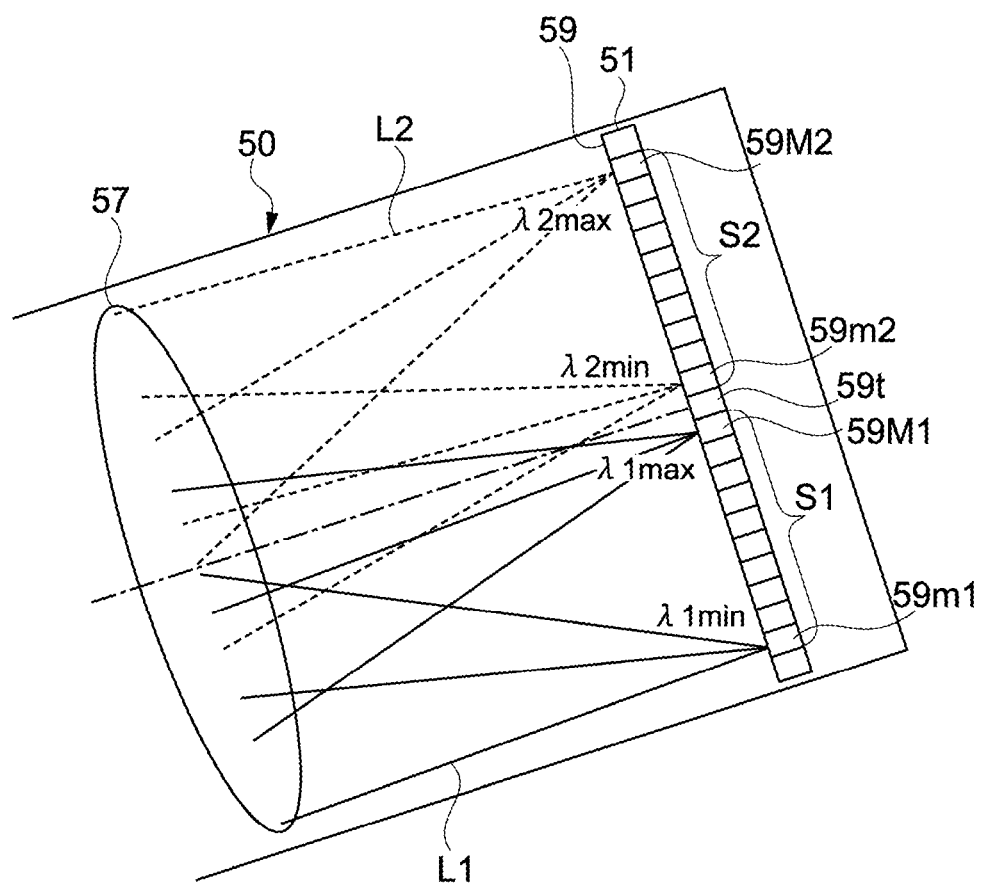
FIG. 5 is a schematic diagram for explaining an example of setting a distance between first and second light-incident ports.

FIG. 5 is a schematic diagram for explaining an example of setting a distance between the first and second light-incident ports 53a and 53b. For example, an area from a light-receiving position (pixel) 59m1 on the line sensor 51 in a case of emitting light λ1min having a shortest wavelength as the first measurement light M1 to a light-receiving position (pixel) 59M1 in a case of emitting light λ1max having a longest wavelength is assumed to be a first measurement target area S1.

Further, an area from a light-receiving position (pixel) 59m2 on the line sensor 51 in a case of emitting light λ2min having a shortest wavelength as the second measurement light M2 to a light-receiving position (pixel) 59M2 in a case of emitting light λ2max having a longest wavelength is assumed to be a second measurement target area S2.

For example, the distance between the first and second light-incident ports 53a and 53b is set as appropriate such that the first and second measurement target areas S1 and S2 can be set on the line sensor 51 without overlapping each other. Accordingly, it becomes possible to clearly and separately set the light-receiving areas of the first and second measurement light M1 and M2 (diffracted light L1 and L2) on the line sensor 51. As a result, it becomes possible to highly accurately measure the positions of the measurement points Q1 and Q2 based on the light-receiving positions.

It should be noted that in this embodiment, the first and second measurement target areas S1 and S2 shown in FIG. 5 respectively correspond to the first and second light-receiving areas 58a and 58b shown in FIG. 3 as they are. The present invention is not limited to this, and it is also possible to configure the spectroscopic optical system 52 such that the first and second light-receiving areas 58a and 58b are set on the line sensor 51 and the first and second measurement target areas S1 and S2 are included in those areas.

The control portion 70 functions as a position calculation unit in this embodiment and calculates the positions of the measurement points Q1 and Q2 based on the signals received from the line sensor 51. For example, the optical heads 10a and 10b are held at a predetermined reference position, and white light W is emitted to the measurement points Q1 and Q2. Then, the positions of the measurement points Q1 and Q2 that use the reference position as a reference are calculated based on the signals from the line sensor 51.

Further, distances respectively between the optical heads 10a and 10b and the measurement points Q1 and Q2 may be calculated as the positions of the measurement points Q1 and Q2. Further, even in a case where the measurement points Q1 and Q2 move, movement amounts of the measurement points Q1 and Q2 can be calculated based on the signals from the line sensor 51 that are output according to the movement (see arrow Y in FIG. 1).

In a case where the optical heads 10a and 10b are used above the measurement points Q1 and Q2, heights of the measurement points Q1 and Q2 may be calculated as the positions of the measurement points Q1 and Q2. Of course, the present invention is not limited to this, and it is also possible to use the optical heads 10a and 10b in an arbitrary direction and calculate the positions in that direction.

By such a position calculation, various measurements such as a measurement of an outline/shape in a mm order, a measurement of a minute shape in a μm order, and a measurement of a work surface property become possible, for example.

The control portion 70 can be realized by a microcomputer in which a CPU, a memory (RAM, ROM), I/O (Input/Output), and the like are accommodated in one chip, for example. Various types of processing to be carried out by the microcomputer can be executed by the CPU in the chip operating according to a predetermined program stored in the memory. Without being limited to this, other ICs (integrated circuits) and the like may be used as appropriate for realizing the control portion 70.

Figure 6:
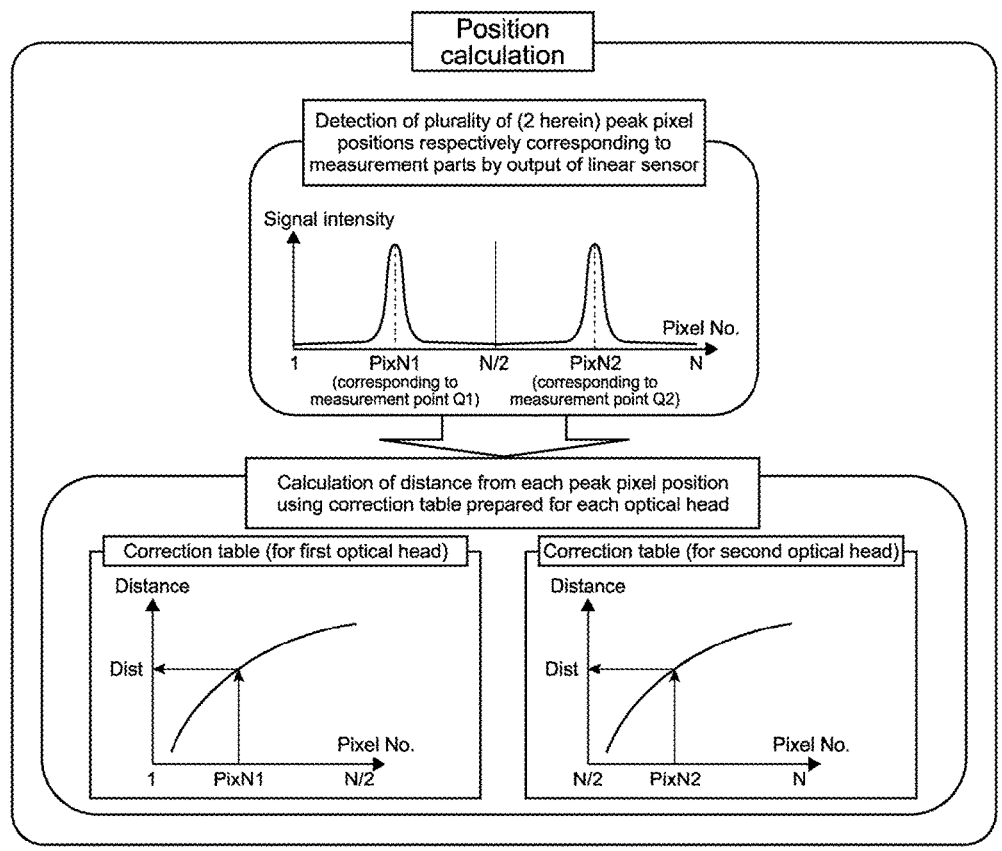
FIG. 6 is a chart showing a calculation example of a position of each of two measurement points by a control portion.

FIG. 6 is a chart showing a calculation example of the position of each of the measurement points Q1 and Q2 by the control portion 70. First, a position of the pixel 59 that outputs a signal intensity peak value (peak pixel position) is detected based on the signals output from the line sensor 51. The peak pixel position corresponds to a light-receiving position of the first and second diffracted light L1 and L2 received by the sensor and is expressed by a pixel number in this embodiment.

In this embodiment, pixel numbers 1 to N/2 are set as the first light-receiving area 58a, and pixel numbers N/2 to N are set as the second light-receiving area 58b. Therefore, a first pixel number PixN1 at a peak pixel position in a range from the pixel numbers 1 to N/2 and a second pixel number PixN2 at a peak pixel position in a range from the pixel numbers N/2 to N are detected.

Based on the detected pixel numbers, the positions of the measurement points Q1 and Q2 (herein, referred to as distance Dist) are calculated. As shown in FIG. 6, the distance Dist of the first measurement point Q1 is calculated from the first pixel number PixN1 with reference to a correction table for the first optical head 10a. Further, the distance Dist of the second measurement point Q2 is calculated from the second pixel number PixN2 with reference to a correction table for the second optical head 10b.

The correction table of each of the first and second optical heads 10a and 10b is created in advance by executing a correction (calibration) using a correction jig or the like whose height or the like is defined, for example, and is stored in the memory of the control portion 70 or the like. A method of creating the correction table, a creation timing, and the like are not limited.

The calculation of the distance Dist is not limited to the method that uses the correction table. For example, a predetermined calculation expression may be stored in the memory or the like so that the distances Dist are calculated from the first and second pixel numbers PixN1 and PixN2 using the calculation expression. Alternatively, the wavelengths of the measurement light M1 and M2 may be calculated from the first and second pixel numbers PixN1 and PixN2. Then, the distances Dist may be calculated from the wavelengths using the correction table, the calculation, or the like.

In the descriptions above, the chromatic sensor 100 of this embodiment includes the plurality of optical heads 10 that perform measurements using light emitted from the light source portion 40. The measurement light M1 and M2 respectively emitted from the optical heads 10 are diffracted by the diffraction grating 56 and respectively emitted to the plurality of light-receiving areas 58a and 58b of the line sensor 51. Therefore, the positions of the plurality of measurement points Q1 and Q2 can respectively be calculated based on the light-receiving positions in the plurality of light-receiving areas 58a and 58b of the line sensor 51. As a result, the multipoint measurement can be executed with a small number of components without increasing the number of diffraction gratings 56 and line sensors 51.

For example, by preparing a plurality of spectrometers 50 in accordance with the number of optical heads 10, it becomes possible to execute a multipoint measurement of measuring a plurality of measurement points at the same time based on the light-receiving position of the line sensor 51 in each of the spectrometers 50. However, in a case of using the spectrometers 50 in the same number as the optical heads 10, upsizing of an apparatus, an increase of apparatus costs, and the like due to an increase of the number of components become a large problem.

In the chromatic confocal sensor 100 according to the present technology, the plurality of measurement light beams M1 and M2 can be respectively emitted to the different light-receiving areas 58a and 58b of a single line sensor 51. In other words, a light-receiving area corresponding to each optical head 10 can be set. Accordingly, it becomes possible to realize a multipoint measurement using a single spectrometer 50 and realize an improvement of user-friendliness and the like by a reduction of a requisite apparatus, miniaturization of an apparatus, lowering of costs of an apparatus, and a reduction of a setting area.

By arranging, as the spectrometer 50, the line sensor 51 and configuring the spectroscopic optical system 52 using the reference axis D as a reference, the measurement light M1 and M2 can be respectively emitted to the different light-receiving areas 58a and 58b of the line sensor 51. By providing the plurality of light-incident ports 53a and 53b at different positions using the reference axis D as a reference in particular, the measurement light M1 and M2 can be easily emitted to the plurality of light-receiving areas 58a and 58b.

Moreover, by setting the virtual light-incident port 90 on the light-incident surface 54 of the spectrometer 50 and setting the optical axis F of the measurement light M that enters from the virtual light-incident port 90 to be the reference axis D, the spectrometer 50 can be configured with ease. For example, with respect to the spectrometer 50 designed such that only one measurement light beam M enters, the plurality of light-incident ports 53a and 53b are formed using original light-incident ports as a reference. For example, the plurality of light-incident ports 53a and 53b are formed while being deviated in a direction substantially vertical to an optical axis of original incident light as described above. Then, the plurality of measurement light beams M1 and M2 are caused to enter substantially parallel to the optical axis of the original incident light. Accordingly, the spectrometer 50 for a multipoint measurement according to the present technology can be configured more easily.

It should be noted that the plurality of light-incident ports 53a and 53b are set at positions mutually symmetrical with respect to the reference axis D (virtual light-incident port 90). Specifically, the plurality of light-incident ports 53a and 53b are formed so as to become symmetrical with respect to the reference axis D along the sensor direction of the line sensor 51 (diffraction direction of diffraction grating 56). Accordingly, the spectrometer 50 can be designed easily. For example, as shown in FIG. 5, the first measurement target area S1 for the first optical head 10a and the second measurement target area S2 for the second optical head 10b can be set on the line sensor 51 without overlapping each other.

Other Embodiments

The present invention is not limited to the embodiment described above, and various other embodiments can also be realized.

In the descriptions above, the case where two optical heads are provided has been described. The number of optical heads included in the chromatic confocal sensor according to the present technology is not limited, and an arbitrary number of optical heads may be provided. For example, by designing the arrangement of the line sensor, the configuration of the spectroscopic optical system, and the like as appropriate and causing measurement light output from the respective optical heads to be emitted to different light-receiving areas on the line sensor, a multipoint measurement can be executed using a single spectrometer.

For example, it becomes possible to measure a tilt of an object to be measured by a 2-point measurement. Moreover, it becomes possible to measure a direction of a front surface of an object to be measured by a 3-point measurement. By using the present technology as described above, various multipoint measurements can be executed.

Figure 7:
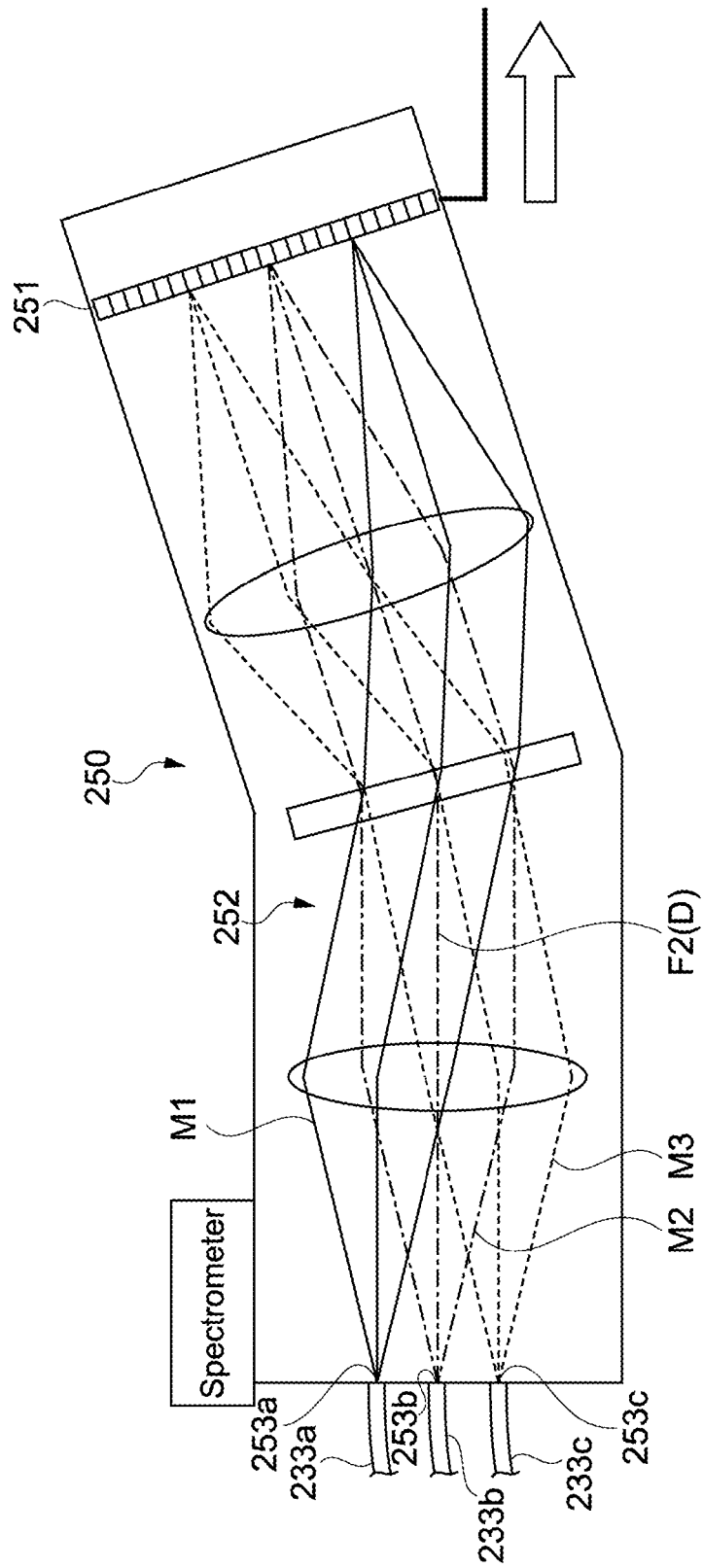
FIG. 7 is a schematic diagram showing another configuration example of a spectrometer.

FIG. 7 is a schematic diagram showing another configuration example of a spectrometer. 3 optical heads are connected to a spectrometer 250 shown in FIG. 7 via optical fibers 233a to 233c. The optical fibers 233a to 233c are respectively connected to 3 light-incident ports 253a to 253c, and measurement light M1 to M3 are emitted to an inside of the spectrometer 250 via the light-incident ports.

The light-incident ports 253a to 253c are provided along a direction corresponding to a line direction of a line sensor 251. In the example shown in FIG. 7, the light-incident port 253b that the measurement light M2 enters is formed at the virtual light-incident port 90 shown in FIG. 4. An optical axis F2 of the measurement light M2 that enters from the light-incident port 253b becomes the predetermined reference axis D. The line sensor 251 may be arranged and the spectroscopic optical system 252 may be configured using the optical axis F2 of the one measurement light M2 as the reference axis D in this way. Accordingly, the spectrometer 250 can be designed easily, though of course not limited thereto.

In the descriptions above, the example where the line sensor is arranged and the spectroscopic optical system is configured using the reference axis, the optical axis of incident light from the virtual light-incident port, and the like as a reference has been described. However, the arrangement method and configuration method are not limited to these methods, and other methods may be adopted. An arbitrary method may be adopted as long as the light-receiving areas for the respective optical heads can be set in different areas of the line sensor.

By narrowing the wavelength band of measurement light, the size of the light-receiving areas (measurement target areas) for the respective optical heads can be made small. Accordingly, setting of the light-receiving areas becomes easy, and it becomes possible to increase the number of optical heads, that is, the number of measurement points as measurement targets.

It should be noted that a configuration of using a plurality of light sources while sufficiently reducing the number of spectrometers is also included in the present technology. For example, LEDs and the like are prepared in a number that is the same as the number of optical heads. Alternatively, it is also possible to allocate one LED or the like to a predetermined number of optical heads. Also in this case, various effects exemplified above can be exerted.

In the descriptions above, white light is used as light including a plurality of visible light beams for a position measurement. The present invention is not limited thereto and is also applicable to a case where other wideband light is used. Specifically, ultraviolet rays, infrared rays, and the like as invisible light may be emitted as the plurality of light beams having different wavelengths. For example, it is possible to use an LED that emits ultraviolet rays, or the like as the light source unit according to the present invention.

At least two of the feature portions according to the present invention described above can be combined. Moreover, the various effects described above are mere examples and should not be limited thereto, and other effects may also be exerted.

What is claimed is:

1. A chromatic confocal sensor, comprising:
a light source portion that emits a plurality of light beams having different wavelengths;
a plurality of optical heads that converge the plurality of light beams emitted from the light source portion at different focal positions and emit measurement light reflected by a measurement point at the focal positions;
a spectrometer including
a line sensor, and
an optical system that includes a diffraction grating that diffracts a plurality of measurement light beams emitted from the plurality of optical heads, and emits each of the plurality of measurement light beams diffracted by the diffraction grating to a plurality of different light-receiving areas of the line sensor; and
a position calculation portion that calculates a position of each of a plurality of measurement points as a measurement target of the plurality of optical heads based on a light-receiving position of each of the plurality of light-receiving areas of the line sensor, wherein the line sensor is arranged while using a predetermined reference axis as a reference, and
the optical system is configured while using the predetermined reference axis as a reference and includes a plurality of light-incident ports that the plurality of measurement light beams enter, the plurality of light-incident ports being provided at different positions while using the predetermined reference axis as a reference.

2. The chromatic confocal sensor according to claim 1, wherein the predetermined reference axis corresponds to an optical axis in a case where the measurement light is caused to enter the optical system from a virtual light-incident port of the spectrometer.

3. The chromatic confocal sensor according to claim 1, wherein
the plurality of light-incident ports are provided such that an optical axis of each of the plurality of measurement light beams that enter from the plurality of light incident ports becomes substantially parallel to the predetermined reference axis.

4. The chromatic confocal sensor according to claim 1, wherein the plurality of light-incident ports are provided at positions that are mutually symmetric with respect to the predetermined reference axis.

5. The chromatic confocal sensor according to claim 2, wherein the plurality of light-incident ports are provided at positions that are mutually symmetric with respect to the virtual light-incident port.

6. The chromatic confocal sensor according to claim 1, wherein the plurality of light-incident ports are provided along a predetermined direction corresponding to a line direction of the line sensor.

7. The chromatic confocal sensor according to claim 6, wherein
the spectrometer includes a light-incident surface on which the plurality of light-incident ports are provided, and
the plurality of light-incident ports are provided on a straight line where a plane including the line direction and a direction of the predetermined reference axis intersect with the light-incident surface.

8. The chromatic confocal sensor according to claim 1, wherein
when an area of the line sensor from a light-receiving position in a case where light having a shortest wavelength out of the plurality of light beams is emitted as the measurement light to a light-receiving position in a case where light having a longest wavelength is emitted as the measurement light, is assumed to be a measurement target area for each of the plurality of optical heads,
the plurality of light-receiving areas correspond to a plurality of measurement target areas respectively corresponding to the plurality of optical heads.

9. The chromatic confocal sensor according to claim 1, wherein
the plurality of optical heads are 2 or 3 optical heads.

10. A measurement method, comprising:
emitting a plurality of light beams having different wavelengths;
converging, by each of a plurality of optical heads, the plurality of emitted light beams at different focal positions and emitting measurement light reflected by a measurement point at the focal positions;
diffracting by an optical system a plurality of measurement light beams emitted from the plurality of optical heads and emitting the diffracted light beams to a plurality of different light-receiving areas of a line sensor; and
calculating a position of each of a plurality of measurement points as a measurement target of the plurality of optical heads based on a light-receiving position of each of the plurality of light-receiving areas of the line sensor, wherein the line sensor is arranged while using a predetermined reference axis as a reference, and
the optical system is configured while using the predetermined reference axis as a reference and includes a plurality of light-incident ports that the plurality of measurement light beams enter, the plurality of light-incident ports being provided at different positions while using the predetermined reference axis as a reference.

* * * * *